(12) United States Patent
Fan

(10) Patent No.: US 8,376,301 B2
(45) Date of Patent: Feb. 19, 2013

(54) APPARATUS FOR HOLDING PORTABLE DEVICES

(76) Inventor: Eagle Fan, Hsinchu (TW)

( * ) Notice: Subject to any disclaimer, the term of this patent is extended or adjusted under 35 U.S.C. 154(b) by 142 days.

(21) Appl. No.: 13/049,235

(22) Filed: Mar. 16, 2011

(65) Prior Publication Data

US 2012/0235005 A1 Sep. 20, 2012

(51) Int. Cl.
*A47G 1/10* (2006.01)
*H04M 1/00* (2006.01)

(52) U.S. Cl. ........... 248/316.4; 248/231.21; 248/346.06; 248/346.07; 379/446; 379/455

(58) Field of Classification Search ............... 248/309.1, 248/316.1, 316.4, 346.06, 346.07, 176.1, 248/176.3, 311.2, 231.21, 917; 379/446, 379/455, 449, 454, 450, 575.9; 24/523; 224/483, 224/571, 552, 567

See application file for complete search history.

(56) References Cited

U.S. PATENT DOCUMENTS

| | | | |
|---|---|---|---|
| 4,118,002 A * | 10/1978 | Bartlett | 248/311.2 |
| 5,457,745 A * | 10/1995 | Wang | 379/454 |
| 5,697,071 A | 12/1997 | Fan | |
| 5,903,645 A * | 5/1999 | Tsay | 379/455 |
| 5,961,016 A * | 10/1999 | Hartmann et al. | 224/571 |
| 6,256,387 B1 * | 7/2001 | Wang | 379/446 |
| 6,320,962 B1 * | 11/2001 | Eisenbraun | 379/446 |
| 6,665,524 B1 * | 12/2003 | Niemann | 455/575.6 |
| 8,240,628 B2 * | 8/2012 | Huang | 248/316.1 |

* cited by examiner

*Primary Examiner* — Tan Le
(74) *Attorney, Agent, or Firm* — Rabin & Berdo, P.C.

(57) ABSTRACT

An apparatus for holding portable electronic devices of different sizes is provided, including a receiving base, a first clamp unit and a second clamp unit, wherein the receiving base has a flat shape, with two opposite surfaces for receiving area and positioning area respectively. The positioning area forms a plurality of positioning sliding trenches in parallel layout. The entrances to the positioning sliding trenches are located at the edge of the receiving base. The ends away from the aforementioned edge of the positioning sliding trenches are closed. A part of the positioning sliding trenches has narrower openings than the width of the trenches. The first clamp unit and the second clamp unit include at least a positioning block respectively. The positioning blocks on the first clamp unit and the second clamp unit are inserted into positioning sliding trenches at corresponding locations. The first clamp unit and the second clamp unit extend to the two sides of the receiving area of the receiving base, facing each other. To adjust the holding width of the two clamps, the positioning blocks can be inserted to a different positioning sliding trench.

7 Claims, 4 Drawing Sheets

APPARATUS FOR HOLDING PORTABLE DEVICES

FIELD OF THE INVENTION

The present invention generally relates to an apparatus for holding portable devices, and more specifically to a holding apparatus with a simple adjustable structure and applicable to holding portable devices of different sizes.

BACKGROUND OF THE INVENTION

An earlier patent owned by the inventor of the present invention, U.S. Pat. No. 5,697,071, disclosed a mobile phone holder structure, including an upper casing member and a lower casing member, each having an inside surface on which a plurality of parallel-arranged guiding slots are formed. Two removable clamps are located on the two sides of the upper and lower casings. The bottom of the clamps forms engaging stripes to be selectively slidably receivable within the guiding slots of the upper and lower casing members. Each of the clamp members has resilient holding sections extending therefrom to define a space for receiving and holding therein a mobile phone. The open end of the casings allows the clamp members to be removed from the casing members and re-inserted into another guiding slot so as to change the distance between the clamp members and thus adapted to hold phones of difference sizes. While many advantages provided by the earlier invention are still valid, several issues have been raised:

1. The holding force between the two clamps weakens when the distance between right clamp and the left clamp is closer to the maximum distance. This is because only the central part is tightly fastened when the upper and the lower casing members are engaged. To avoid the interfering the insertion of the clamps, no additional fastening elements are added. Therefore, the holding force at the edges of the upper and lower casings is only provided by the strength of the material, usually made of plastics. When the right and the left clamps are moved to the rightmost and leftmost positions respectively, the edges of the plastic upper and lower casings are prone to be stretched and deformed when the outward force between the right and left clamps is too large. In this manner, the engaging stripes can be easily disengaged from the guiding slots so that the clamps can no longer clamp to hold the device. The longer the apparatus is in use, the likelihood of this situation is increased.
2. The number of components in the earlier invention is larger and screws are required to fasten components, leading to higher manufacturing cost.
3. The size is bulky and the design appears less streamlined.

Therefore, the inventor has redesigned a new apparatus for holding portable devices of different sizes.

SUMMARY OF THE INVENTION

The primary object of the present invention is to provide an apparatus for holding portable devices. The main feature of the present invention is to form a plurality of positioning sliding trenches of special shape on a surface area of a receiving base. The two sides of the receiving base include a first clamp unit and a second clamp unit, facing each other. The first clamp unit and the second clamp unit include positioning blocks for inserting into the aforementioned positioning sliding trenches to achieve the holding width adjustment. Because the positioning blocks are not easily disengaged from the positioning sliding trench of special shape, the first clamp unit and the second clamp unit can be tightly fastened to any positioning sliding trench on the receiving base to maintain good clamping effect.

Another object of the present invention is to provide a small-size, simple-structure holding apparatus. By forming a plurality of positioning sliding trenches on a surface of a single receiving base, the manufacturing cost can be reduced by saving the lower casing of the earlier invention, as well as, the process forming guiding slots in the upper and lower casings in the earlier invention. In this manner, the cost is lowered and the product becomes more competitive. The small-size design also meets the requirements of the contemporary small-size electronic devices.

Yet another object of the present invention is to provide a holding apparatus with interchangeable parts. Because of the simple structure, the components of the present invention with the similar shape are interchangeable; therefore, the customer can purchase two or more sets at a time and exchange components in each set to form interesting novel design or color combinations.

To achieve the aforementioned objects, the present invention provides an apparatus for holding portable electronic devices of different sizes, including a receiving base, a first clamp unit and a second clamp unit, wherein the receiving base has a flat shape, with two opposite surfaces for receiving area and positioning area respectively. The positioning area forms a plurality of positioning sliding trenches in parallel layout. The entrances to the positioning sliding trenches are located at the edge of the receiving base. The ends away from the aforementioned edge of the positioning sliding trenches are closed. A part of the positioning sliding trenches has narrower openings than the width of the trenches. The first clamp unit and the second clamp unit include at least a positioning block respectively. The positioning blocks on the first clamp unit and the second clamp unit are inserted into positioning sliding trenches at corresponding locations. The first clamp unit and the second clamp unit extend to the two sides of the receiving area of the receiving base, facing each other. To adjust the holding width of the two clamps, the positioning blocks can be inserted to a different positioning sliding trench.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
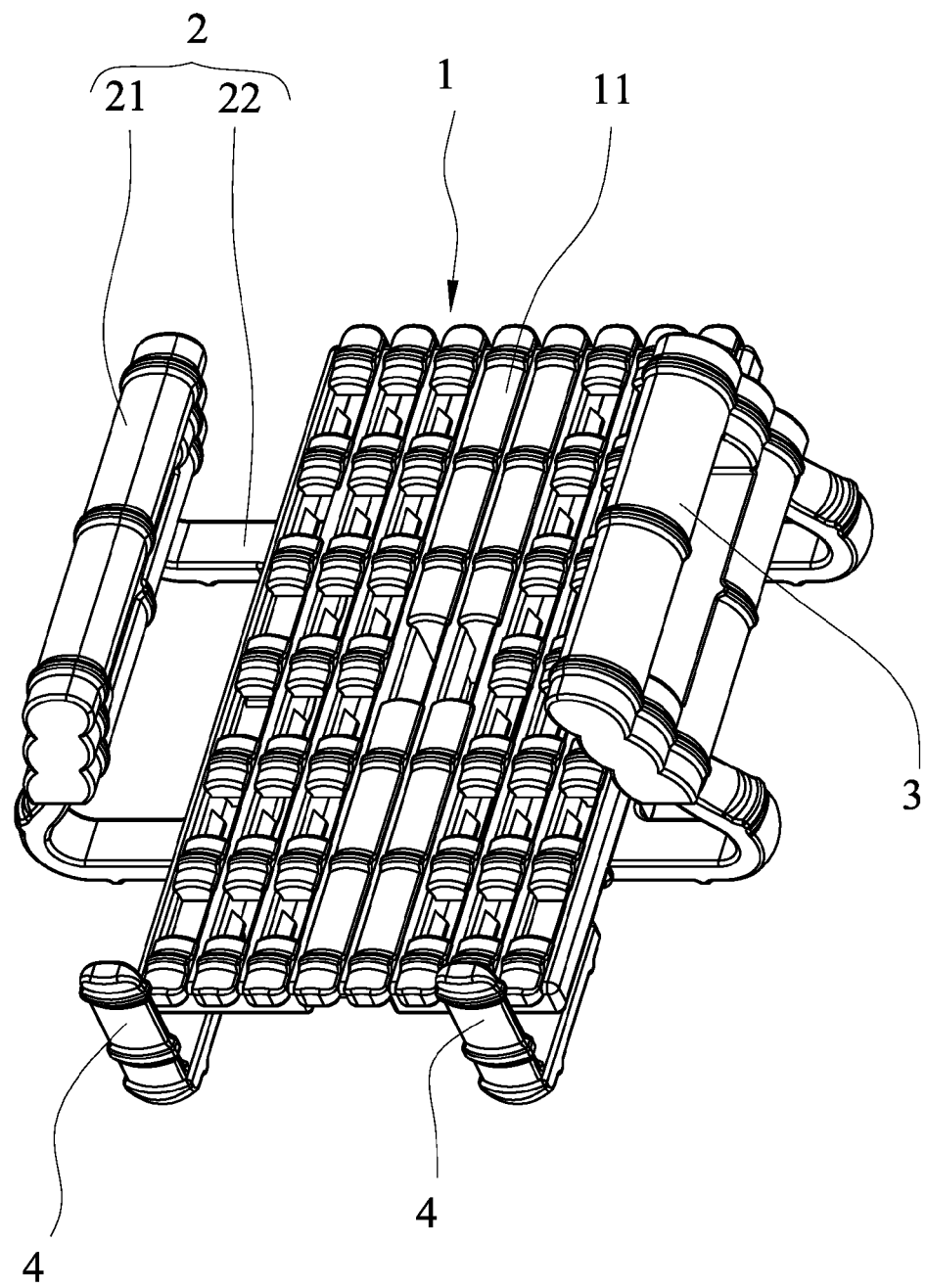
FIG. 1 shows a schematic view of the first embodiment according to the invention.

FIG. 1 shows a schematic view according to the invention. The holding apparatus includes a receiving base 1, a first clamp unit 2 and a second clamp unit 3. The present invent may further include at least a stopping unit 4. First clamp unit 2 and second clamp unit 3 are placed on the two sides of receiving base 1, facing each other. Stopping unit 4 is located at the edge of receiving base 1, protruding above the surface of receiving base 1 to stop the held electronic device from slipping. The width between first clamp unit 2 and second clamp unit 3 is adjustable to accommodate electronic devices of different sizes.

Figure 2:
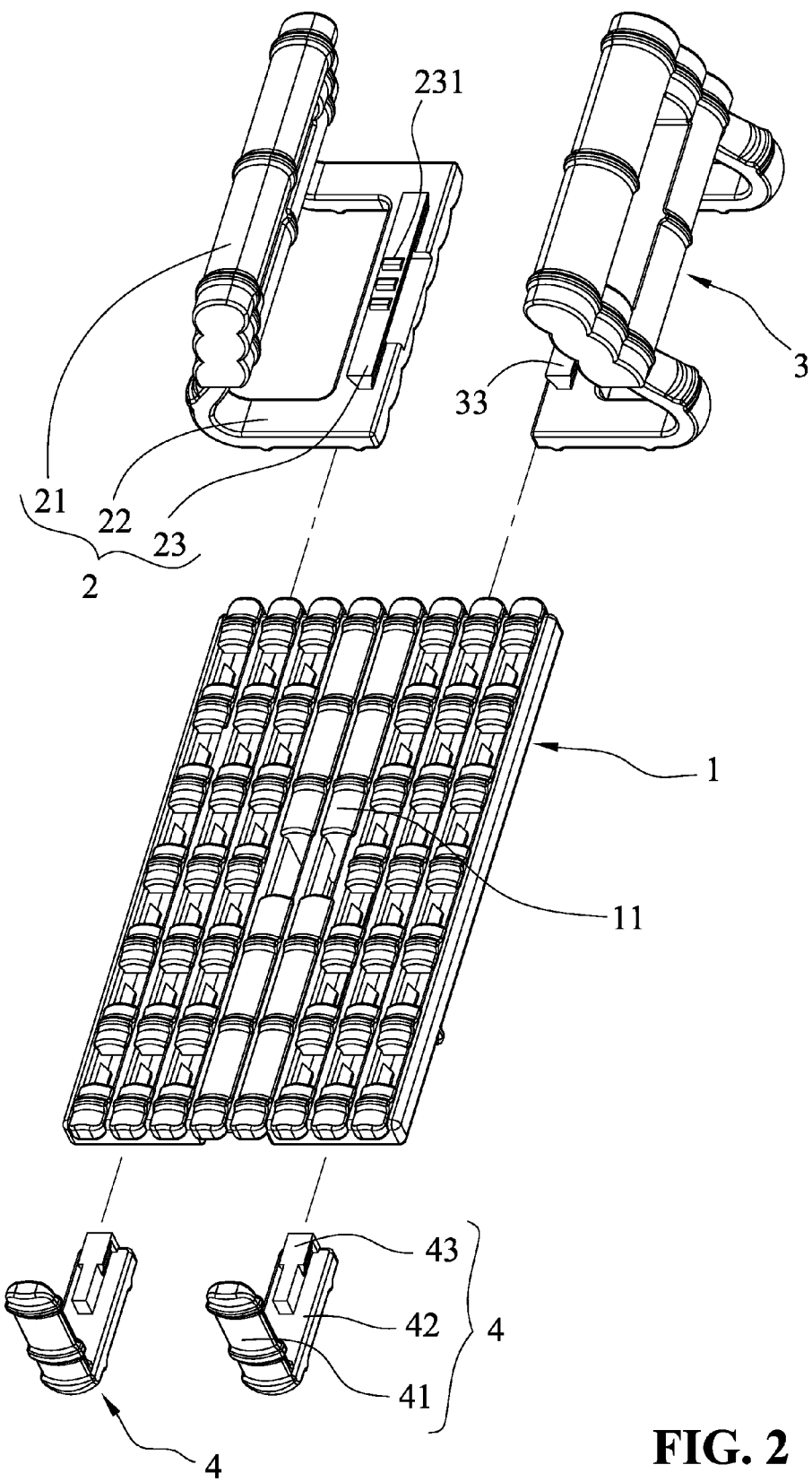
FIG. 2 shows an exploded view of the first embodiment in FIG. 1.

FIG. 2 shows a schematic view of the details of each component according to the present invention. As shown in FIG. 2, first clamp unit 2 and second clamp unit 3 have the shape of a bended acute angle. Because two clamp units are similar in shape, the following describes only first clamp unit 2. First clamp unit 2 includes a slanted clamping element 21 and an extending element 22 extending horizontally, forming an acute angle between the two elements. Extending element 22 includes two slightly narrower arc plates extending to connect to clamping element 21 so that clamping element 21 has slight resilience for deforming and expanding outwards. The outside of clamping element 21 is made of soft material to prevent scratching the surface of the held electronic device as well as provide additional room for compression to accommodate the holding electronic devices not of exact size. The friction from the deforming effect of clamping element 21 can also assist to maintain firm holding. First clamp unit 2 further includes at least a positioning block 23, located on a wide plate of extending element 22. Similarly, second clamp unit 3 also includes at least a positioning block 33. First clamp unit 2 and second clamp unit 3 use positioning blocks 23, 33, respectively to engage receiving base 1. Auxiliary design can be added to positioning block 23, such as, the joint of positioning block 23 and extending element 22 is perforated. The top surface of positioning block 23 at the perforated part includes a plurality of protruding stripes 231. The perforation and protruding stripes 231 are to enhance the engagement of positioning.

Figures 3A, 3B, 3C:
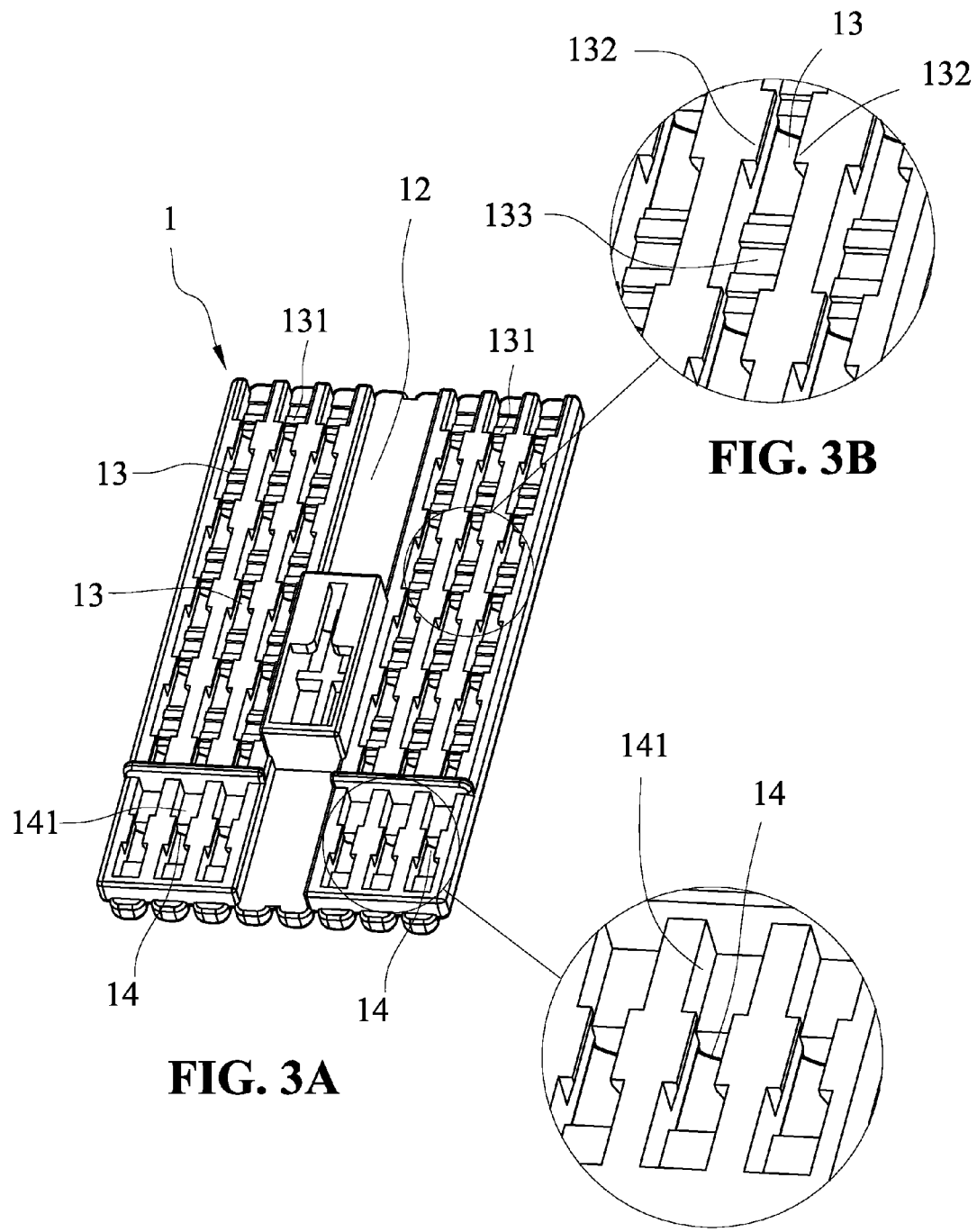
FIG. 3A shows a schematic view of the positioning area at the back of holding apparatus according to the present invention.
FIG. 3B shows a partially enlarged view of positioning sliding trenches of FIG. 3A.
FIG. 3C shows a partially enlarged view of positioning trenches of FIG. 3A.
Figure 4:
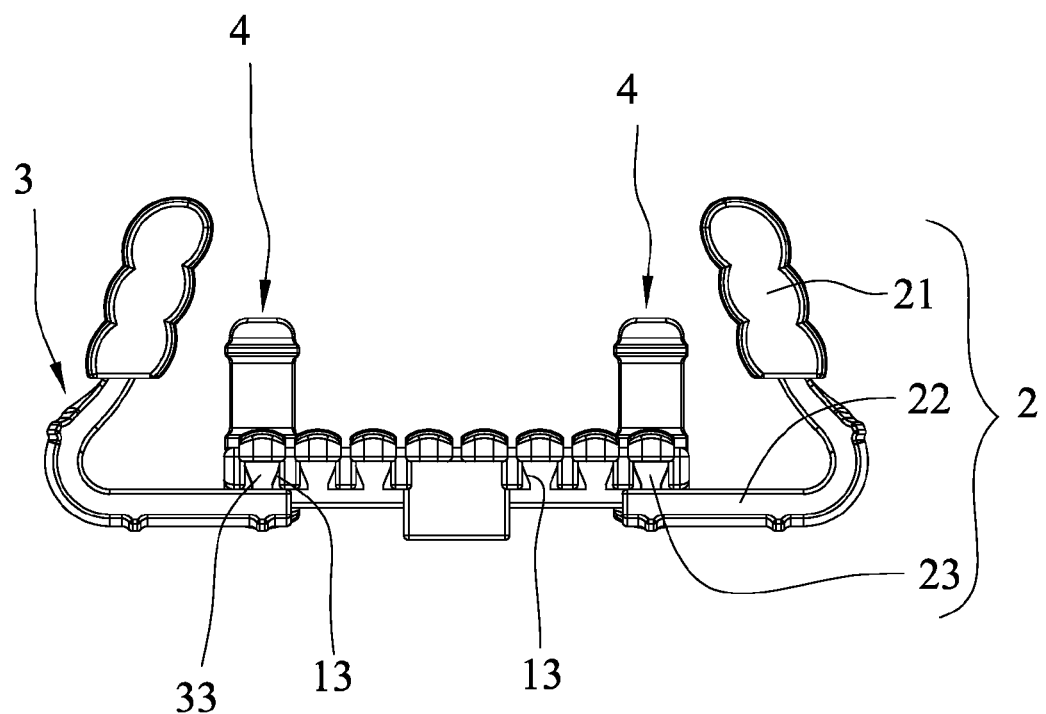
FIG. 4 shows a front view of the first embodiment according to the present invention.

Receiving base 1 is has a flat shape. The two largest opposite surfaces are defined as receiving area 11 and positioning area 12. Receiving area 11 is to provide the place for placing held electronic device. Receiving area 11 is not necessarily completely flat. For example, the present embodiment shows a plurality of arc surfaces in parallel layout spaced by grooves. As shown in FIG. 3A, positioning area 12 includes a plurality of positioning sliding trenches 13 in parallel layout. The direction of positioning sliding trenches is perpendicular to the direction of the clamping. In the present embodiment, positioning sliding trenches 13 are grouped. Positioning sliding trenches 13 in each group are to match positioning blocks 23, 33 of first clamp unit 2 or second clamp unit 3 for engagement. Positioning sliding trenches 13 are for connecting first clamp unit 2 and second clamp unit 3 to receiving base 1, with the purposes of guiding and fastening, unlike in earlier invention, for only guiding without fastening. In addition, with a plurality of positioning sliding trenches 13, the width between first clamp unit 2 and second clamp unit 3 can be adjusted. As shown in FIG. 3B, the opening of positioning sliding trench 13 is narrower than the width inside positioning sliding trench 13. In the present embodiment, the trench has the shape of a dovetail, but is not limited to the above embodiment. For example, a T-shape trench also has a narrower opening than the width inside the trench. Also, as shown in FIG. 3A, entrance 131 of positioning sliding trench 13 is located near the edge of receiving base 1, and far end of the trench is closed so that positioning blocks 23, 33 will not slip off position sliding trench 13 after positioning blocks 23, 33 are inserted from entrance 131 of positioning sliding trench 13. In the present embodiment for the purpose of mold-making and positioning, each part of the trench of positioning sliding trench has a different shape. In other words, a dovetail shape is formed in each segment of the trench separately. For example, only some segments include conic protruding blocks facing each other, instead of continuous trench in conventional design. However, as shown in FIG. 4, the entrance to positioning sliding trench 13 still shows a dovetail shape. Matching trenches 133 are also included at the bottom of some segments of positioning sliding trenches 13. Matching trenches 133 correspond to the locations of protruding stripes 231 for positioning.

In the present embodiment, positioning area 12 further includes a plurality of engaging trenches 14 in parallel layout. The shape of engaging trenches 14 is different from the shape of positioning sliding trenches 13. As shown in FIG. 3A, 3C, both ends of engaging trenches 14 are closed, with an entrance 141 at some segments. Engaging trenches 14 are for the engagement between receiving base 1 and stopping unit 4. Stopping unit 4 is shaped as the letter L, formed by a vertical stopping element 41 and a connecting element 42 extending horizontally. Connecting element 42 includes an engaging block 43, shaped to match engaging trench 14. To assemble, engaging block 43 is aligned with entrance 141 of engaging trench 14, and sliding along the trench after placed in so that engaging block 42 is fastened inside engaging trench 14. In this manner, stopping unit 4 is engaged to the edge of receiving base 1.

In summary, the present invention is to form a plurality of positioning sliding trenches 13 at a large surface positioning area 12 of receiving base 1, and the opening of positioning sliding trenches 13 is narrower than the width inside positioning sliding trenches 13 so that first clamp unit 2 and second clamp unit 3 can insert positioning block 23, 33 into corresponding positioning sliding trenches 13 without slipping off. In this manner, the holding width between first clamp unit 2 and second clamp unit 3 is fixed. The holding width can be adjusted by inserting first clamp unit 2 and second clamp unit 3 into different positioning sliding trenches. The positioning after adjustment is provided by protruding stripes 231 of positioning block 23 and matching trench 133 of positioning sliding trench 13.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for holding portable devices, comprising:
a first clamp unit having at least a first positioning block;
a second clamp unit having at least a second positioning block; and
a receiving base having a flat shape, with two opposite surfaces thereof being respectively a receiving area and a positioning area, said first clamp unit and said second clamp unit being located on two sides of said receiving area of said receiving base and facing each other, said positioning area including a plurality of positioning sliding trenches in a parallel layout with entrances to said positioning sliding trenches being located at an edge of said receiving base, and with opposite ends of said positioning sliding trenches that are away from said entrances being closed, said positioning sliding trenches having openings that are narrower than a width inside said trenches;

said first clamp unit and said second clamp unit partially extending to said positioning area of said receiving base, said first and second positioning blocks being insertable into corresponding positioning sliding trenches of said positioning area so that said first clamp unit and said second clamp unit maintain a distance to hold a portable device, the distance between said first clamp unit and said second clamp unit being adjustable by inserting said first clamp unit and said second clamp unit into different positioning sliding trenches;

wherein only some segments of said positioning sliding trenches have openings that are narrower than the width inside said trenches; and wherein an area of said first and second positioning blocks is perforated, a top surface of said first and second positioning blocks having a plurality of protruding stripes, and a bottom of said positioning sliding trenches comprises at least a matching trench corresponding to a location of said protruding stripes.

2. The apparatus as claimed in claim 1, wherein some segments of said positioning sliding trench have a cross-section shaped as a dovetail.

3. The apparatus as claimed in claim 1, wherein said first clamp unit and said second clamp unit are shaped as a bended acute angle, formed by a slanted clamping element and an extending element extending horizontally.

4. The apparatus as claimed in claim 3, wherein an exterior material of said clamping element is made of soft material.

5. The apparatus as claimed in claim 1, wherein said receiving base further comprises at least a stopping unit located at an edge of said receiving base away from said entrance to said positioning sliding trenches.

6. The apparatus as claimed in claim 5, wherein said positioning area of said receiving base further comprises a plurality of engaging trenches in a parallel layout, said stopping unit extending partially to said positioning area, said stopping unit further comprises an engaging block for inserting into said engaging trench of said positioning area.

7. The apparatus as claimed in claim 5, wherein said positioning area of said receiving base further comprises a plurality of engaging trenches, each having a narrower opening than a width inside said trenches, said stopping unit extending partially to the positioning area, said stopping unit further comprises an engaging block for inserting into said engaging trench of said positioning area and being moveable inside said trench to adjust a location of said stopping unit.

* * * * *